Aug. 14, 1956

L. L. PRUEHS 2,758,821

TEMPERATURE CONTROL FOR AUXILIARY
COMPARTMENTS FOR REFRIGERATORS
Filed March 15, 1954

INVENTOR.
LESLIE L. PRUEHS
BY
HIS ATTORNEY

United States Patent Office 2,758,821
Patented Aug. 14, 1956

2,758,821

TEMPERATURE CONTROL FOR AUXILIARY COMPARTMENTS FOR REFRIGERATORS

Leslie L. Pruehs, Erie, Pa., assignor to General Electric Company, a corporation of New York Application March 15, 1954, Serial No. 416,073

2 Claims. (Cl. 257—9)

This invention relates to auxiliary compartments for household refrigerators, for storing butter and the like, which compartments are cooled from the food storage compartment, and, more particularly, to means for controlling the temperature of such auxiliary compartments.

Auxiliary compartments are sometimes provided in household refrigerators and maintained at a higher temperature than that of the main refrigerated food storage compartment of the refrigerator for storing foods, such as butter and the like, at a higher temperature at which the butter, for example, spreads easily. Such auxiliary compartments are separate from but are in thermal conducting communication with the main refrigerated compartment so as to be cooled thereby; and a heater is provided for maintaining the auxiliary compartment at a satisfactory higher temperature. The heater heretofore has been controlled, for example, by a thermostat responsive to the temperature of the auxiliary compartment for maintaining the desired temperature. While a thermostatic control is quite satisfactory for maintaining the desired temperature in the auxiliary compartment, it has the disadvantage of being relatively expensive.

The principal object of this invention is to provide an inexpensive control for regulating the temperature of the auxiliary compartment which renders a thermostat unnecessary, and which in a reliable and inexpensive way applies heat to and controls the temperature of the compartment. Moreover, this control is easily manually adjustable to regulate the temperature held, and also to control the point at which heat is applied.

In accordance with my invention, the refrigerator cabinet includes a refrigerated compartment and a thermally insulated auxiliary compartment thermally communicating with the refrigerated compartment so as to be cooled thereby. A heater element is employed for maintaining the auxiliary compartment at a higher temperature than the refrigerated compartment. This heater element is disposed adjacent a wall of the auxiliary compartment and is movably supported with respect to the wall so that it can be adjusted toward and away from the wall. Means are provided to move the heater element to vary the distance of the heater element from the wall thereby to control or set the temperature held in the auxiliary compartment.

Further objects and advantages of the invention will become apparent as the following description proceeds, and the features of novelty which characterize the invention will be pointed out with particularity in the claims annexed to and forming a part of this specification.

For a better understanding of this invention reference may be had to the accompanying drawing, in which.

Figure 1:
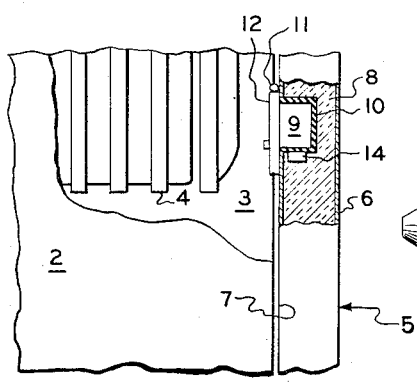
Fig. 1 is an elevation view, partly in section, of a portion of a refrigerator cabinet including an auxiliary compartment arranged in accordance with this invention.
Figure 4:
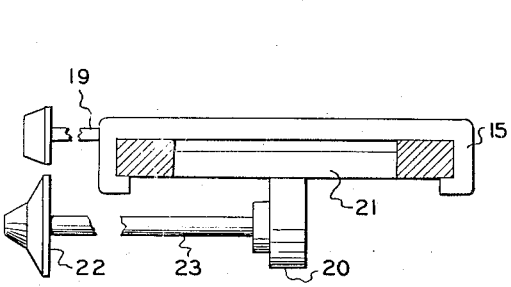
Fig. 4 is a sectional view taken along the line 4—4 of Fig. 3 and looking in the direction of the arrows.
Figure 2:
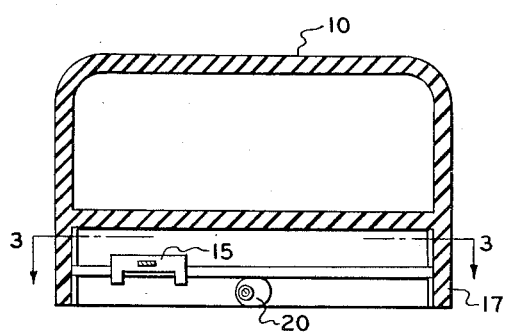
Fig. 2 is a sectional view of an auxiliary compartment embodying the present invention.

Referring to the drawing and particularly to Fig. 1, there is shown a refrigerator cabinet 2 having a refrigerated food storage compartment 3, which is cooled by a cooling unit or evaporator 4 of the usual well-known refrigerating system.

A door 5 provides access to the food storage compartment 3. This door includes an outer wall 6 and an inner wall 7 spaced from said outer wall with suitable insulation 8 disposed therebetween. An auxiliary compartment 9, defined by a wall 10, is provided in the door 5. The wall 10 is preferably made of a plastic material but may be made of any material that will transfer heat. A door 11, hinged at 12 to the inner wall 7 of the door 5 provides an access opening to the auxiliary compartment 9.

The auxiliary compartment 9 is provided for the preservation at a somewhat higher temperaure than that existing in the refrigerated compartment 3 of foods, such as butter and the like, which may require slightly higher temperatures for satisfactory spreading. This chamber is in thermal conducting relation with compartment 3 through the door 12 so as to be cooled from the compartment 3. To maintain the auxiliary compartment 9 at the desired higher temperature, an electric heater 14 is mounted adjacent the wall 10 of the auxiliary compartment 9. Power may be supplied to the door and to the heater 14 in any suitable manner, for example, by an arrangement such as that disclosed in Patent No. 2,522,989, issued in the name of Richard J. Carbary, and assigned to the same assignee as the present invention. Since the details of the structure for supplying power to the door and to the heater are not part of the present invention, they have not been illustrated in the drawing.

Figure 3:
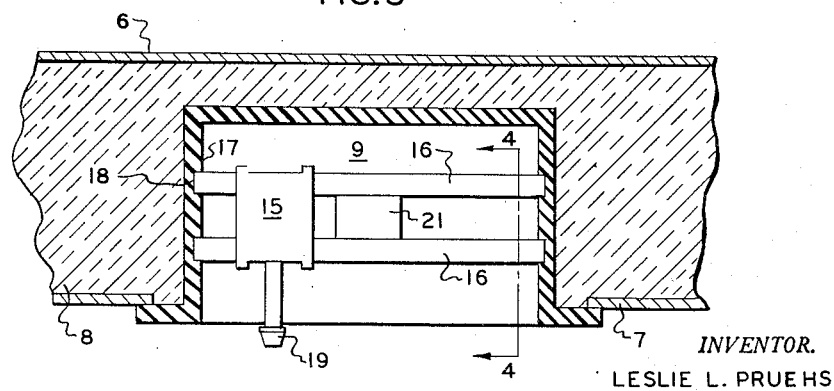
Fig. 3 is a sectional view taken along the line 3—3 of Fig. 2 and looking in the direction of the arrows.

The heater 14 includes a heater element 15 that is mounted for slidable engagement on a pair of rails 16. The rails 16 are supported by the depending walls 17 of the auxiliary compartment 9. The depending walls 17 of the auxiliary compartment 9 have grooves or notches 18 therein, as shown in Fig. 3, that receive the ends of the rails 16 to permit the rails 16 and the heater element 15 to be moved with respect to the wall 10 of the auxiliary compartment 9. A control member or handle 19 is connected to the heater element 15 for sliding the heater element 15 along the rails 16 to move the element 15 longitudinally with respect to the wall 10 of the auxiliary compartment 9.

A cam 20 is adapted to engage a connecting member 21 that joins the two rails 16 together. The cam's engagement with the member 21 permits the heater element 15 and the rails 16 to be moved up and down with respect to the bottom wall of the auxiliary compartment 9. It will be seen that the member 21 permits the rails 16 and the heater element 15 to be moved as a unit. The cam 20 is actuated by means of a control knob 22 that is connected to the cam by a shaft 23.

By actuation of the control knob 22, it will be observed that the heater element 15 may be moved closer to or further away from the wall 10 of the auxiliary compartment 9 so that the temperature within the compartment 9 is varied accordingly. Similarly, by movement of the control handle 19, the position of the heater element 15 with respect to the auxiliary compartment 9 may be varied so that heat may be applied substantially at only one end, or at any other selected part of the adjacent wall of the compartment 9. Thus, not only may the amount of heat supplied to the auxiliary compartment 9 be varied but the location at which it is applied may also be varied; thus will vary the temperature along the compartment bottom wall.

Figure 5:
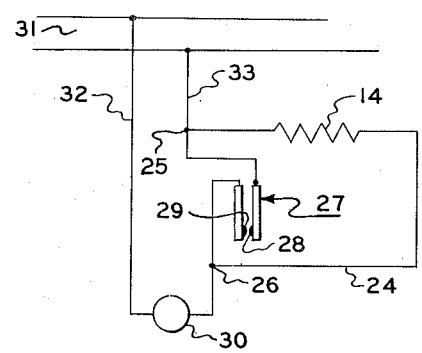
Fig. 5 is a wiring diagram of heater and certain control elements therefor.

It is desired that the heater 14 be energized only when the refrigerating unit is de-energized and that when the refrigerating unit is energized the heater 14 be de-energized. One method of accomplishing this result is by employing the circuit shown in Fig. 5. The heater 14 is connected in an energizing circuit 24, which is connected at 25, 26 across the terminals of a switch 27. The switch 27 includes a movable contact 28 and a stationary contact 29. Suitable means may be employed to move the movable contact 28 into contact with the stationary contact 29 to close the switch 27 whenever it is desired to energize the motor 30 of the refrigerating unit. When the switch 27 is in its open position, the circuit 24 is connected to the power source 31 in series with the motor 30 of the refrigerating unit through the lines 32, 33. The heater 14 is therefore energized when the refrigerating unit is de-energized, that is when the switch 27 is open; and the heater 14 conversely is de-energized when the refrigerating unit is energized, that is when the switch 27 is closed. As the ambient temperature rises the refrigerating unit normally is required to operate a greater proportion of the time in order to maintain the temperature of the refrigerated compartment 3 at a satisfactory temperature. At the same time, a rise in the ambient temperature, because of the resultant increased heat leakage into the auxiliary compartment 9, results in a smaller requirement of heat to be supplied by the heater 14. It will be understood that other circuits could be employed if desired. It will also be understood that the heater could be energized at all times, if desired, or a manual switch could be provided to energize the heater only when the user of the refrigerator so desired.

While the heater 14 has been shown as disposed below the bottom wall of the auxiliary compartment 9, it will be understood that the heater could be adjacent one of the other walls of the auxiliary compartment if so desired. Similarly, a spring lifting device, for example, could be employed instead of the cam mechanism 20 to move the heater 14 towards and away from the wall 10 of the auxiliary compartment 9. A leverage system might also be employed to move the heater 14 closer to or further from the wall of the auxiliary compartment 9, if so desired. It also will be noted that the auxiliary compartment 9 could be positioned in the refrigerated compartment 3 rather than in the door 5.

While the present invention has been described by reference to a particular embodiment thereof, it will be understood that modifications may be made by those skilled in the art without actually departing from the invention. I, therefore, aim in the appended claims to cover all such variations as come within the true spirit and scope of the foregoing disclosure.

I claim:

1. A refrigerator cabinet including a refrigerated compartment, a thermally insulated auxiliary compartment thermally communicating with said refrigerated compartment, means for cooling said refrigerated compartment, an electric heater element for maintaining said auxiliary compartment at a higher temperature than said refrigerated compartment, said heater element being disposed adjacent a wall of said auxiliary compartment, rails supported by said auxiliary compartment, said heater element being supported by said rails for longitudinal movement with respect to said wall, means to move said heater element along said rails, and means for moving said rails and said heater element to vary the distance between said heater element and said wall of said auxiliary compartment to vary the temperature of said auxiliary compartment.

2. A refrigerator cabinet including a refrigerated compartment, a thermally insulated auxiliary compartment thermally communicating with said refrigerated compartment, means for cooling said refrigerated compartment, an electric heater element for maintaining said auxiliary compartment at a higher temperature than said refrigerated compartment, said heater element being disposed adjacent a wall of said auxiliary compartment, rails supported by said auxiliary compartment, said heater element being supported by said rails for longitudinal movement with respect to said wall, means to move said heater element along said rails, a cam mechanism for moving said rails and said heater element to vary the distance between said heater element and said wall of said auxiliary compartment to vary the temperature of said auxiliary compartment, a shaft attached to said cam mechanism, and a control knob secured to said shaft, said control knob being adapted to adjust said heater element to its desired position to produce the desired temperature.

References Cited in the file of this patent

UNITED STATES PATENTS

| | | |
|---|---|---|
| 2,068,550 | Knight | Jan. 19, 1937 |
| 2,115,944 | De Witt | May 3, 1938 |
| 2,378,816 | Wild | June 19, 1945 |
| 2,627,393 | Shell | Feb. 3, 1953 |